(12) United States Patent
Huang et al.

(10) Patent No.: US 9,027,399 B2
(45) Date of Patent: May 12, 2015

(54) LIQUID LEVEL SENSOR

(71) Applicants: Hong Fu Jin Precision Industry (ShenZhen) Co., Ltd., Shenzhen (CN); Hon Hai Precision Industry Co., Ltd., New Taipei (TW)

(72) Inventors: Tian-Feng Huang, Shenzhen (CN); Wen-Li Wang, Shenzhen (CN); Hao-Chung Lee, New Taipei (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 85 days.

(21) Appl. No.: 13/754,845

(22) Filed: Jan. 30, 2013

(65) Prior Publication Data

US 2013/0213495 A1 Aug. 22, 2013

(30) Foreign Application Priority Data

Feb. 17, 2012 (CN) .......................... 2012 1 0036447

(51) Int. Cl.
*G01F 23/00* (2006.01)
*G01F 23/60* (2006.01)
*G01F 23/56* (2006.01)
*G01F 23/30* (2006.01)

(52) U.S. Cl.
CPC ................ *G01F 23/00* (2013.01); *G01F 23/56* (2013.01); *G01F 23/606* (2013.01)

(58) Field of Classification Search
CPC ....... G01F 23/00; G01F 23/268; G01F 1/684;
G01F 23/04; G01F 25/0061; G01F 1/005;
G01F 23/0023; G01F 23/003; G01F 23/0038;
G01F 23/02; G01F 23/30
USPC ........... 73/866.5, 1.73, 305, 290 R, 319, 298;
702/55
See application file for complete search history.

(56) References Cited

U.S. PATENT DOCUMENTS

| | | | | | |
|---|---|---|---|---|---|
| 4,215,574 | A | * | 8/1980 | Godeux | 73/314 |
| 4,852,404 | A | * | 8/1989 | Catanese | 73/319 |
| 4,938,590 | A | * | 7/1990 | Ishida | 356/5.01 |
| 7,259,384 | B2 | * | 8/2007 | Hariram et al. | 250/577 |

FOREIGN PATENT DOCUMENTS

| | | | | |
|---|---|---|---|---|
| EP | 0482883 A1 | * | 10/1991 | G01F 23/04 |
| JP | 61237019 A | * | 10/1986 | G01F 23/62 |

* cited by examiner

*Primary Examiner* — Hezron E Williams
*Assistant Examiner* — Marrit Eyassu
(74) *Attorney, Agent, or Firm* — Novak Druce Connolly Bove + Quigg LLP

(57) ABSTRACT

A quartz glass liquid level sensor includes a support frame, a light masking plate, a quartz glass tube, and a sensor module. The light masking plate is movably mounted on the support frame. The quartz glass tube is movably mounted to the support frame. One end of the quartz glass tube is securely fixed to the light masking plate. The sensor module is mounted on the support frame, for sensing a position of the light masking plate relative to the support frame.

14 Claims, 2 Drawing Sheets

US 9,027,399 B2

LIQUID LEVEL SENSOR

BACKGROUND

1. Technical Field

The present disclosure relates to liquid level sensors, and particularly to a quartz glass liquid level sensor.

2. Description of Related Art

Magnetic float liquid level sensors are usually used in a high-temperature or corrosive environment to indicate a liquid level. The magnetic float liquid level sensor includes a sleeve, a magnetic ring, a connection shaft, a float, and a sensor module. The magnetic ring is mounted in the sleeve. The float is connected to the magnetic ring via the connecting shaft. The magnetic ring moves up or down with the float. The liquid level is indicted by a position of the magnetic ring relative to the sensor module. The magnetic ring may easily be destroyed or contaminated, so that a service life of the liquid level float may be shortened.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure.

Moreover, in the drawings, like reference numerals designate corresponding parts throughout the several views.

DETAILED DESCRIPTION

Figure 1:
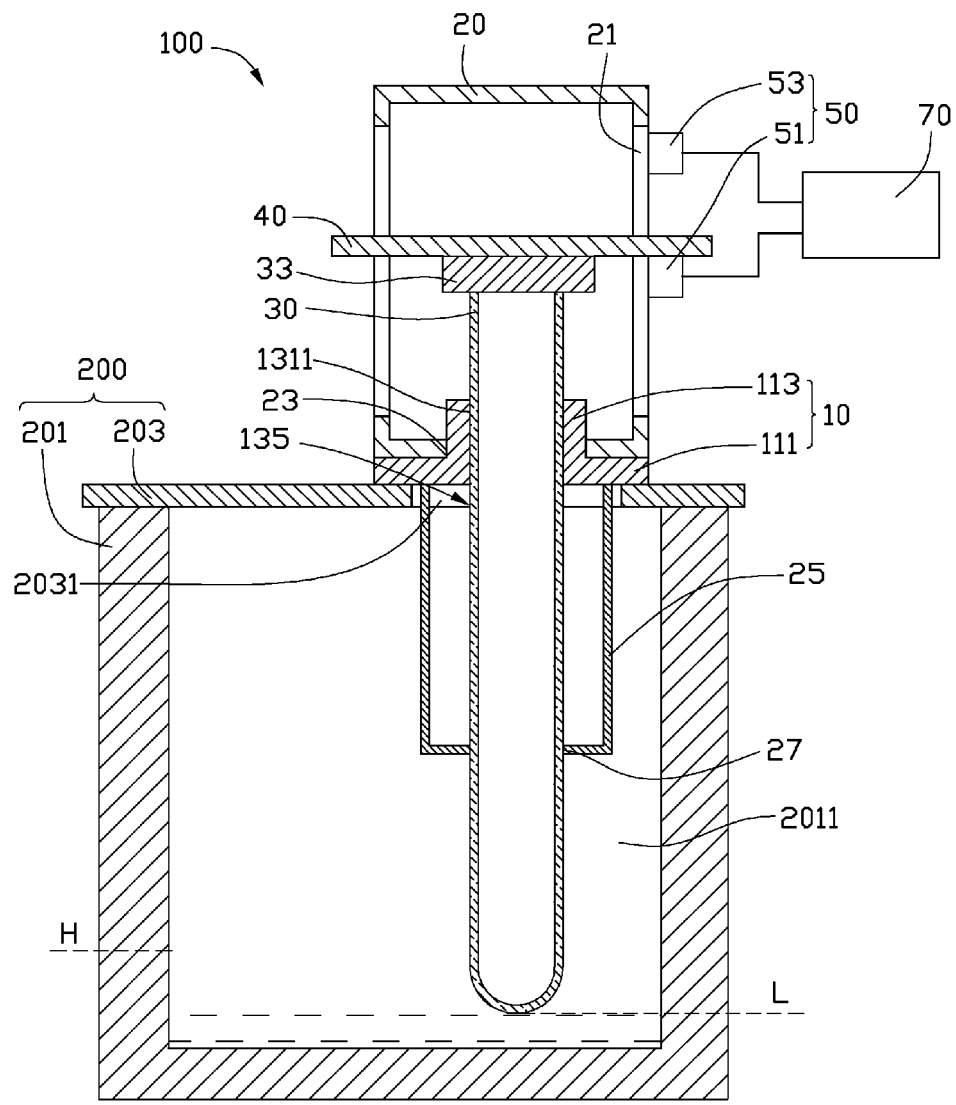
FIG. 1 shows a cross section of one embodiment of a quartz glass liquid level sensor including a quartz glass tube in a first predetermined position.

FIG. 1 shows a quartz glass liquid level sensor 100 for sensing a liquid level of a liquid in a container 200. The container 200 includes a container body 201 and a cover 203 covering the container body 201. The container body 201 defines a receiving groove 2011. In an illustrated embodiment, the liquid in the receiving groove 2011 is corrosive and under a high temperature. A lowest level line L (a first predetermined position) and a highest level line H (a second predetermined position) are defined in a sidewall of the container body 201. The cover 203 defines a through hole 2031 for mounting the quartz glass liquid level sensor 100.

The quartz glass liquid level sensor 100 includes a base seat 10, a support frame 20, a guiding member 25, a quartz glass tube 30, a sealing member 33, a light masking plate 40, a sensor module 50, and a control module 70. The support frame 20 is securely mounted on the base seat 10, for guiding a movement of the light masking plate 40. The quartz glass tube 30 is movably mounted on the base seat 10. The quartz glass tube 30 floats on the liquid inside the container 200. The light masking plate 40 is mounted on one end of the quartz glass tube 30 away from the container 200, and moves with the quartz glass tube 30 alongside the support frame 20. The sensor module 50 is securely mounted on the support frame 20, for sensing a position of the light masking plate 40 relative to the support frame 20. The control module 70 is connected to the sensor module 50 and a liquid source (not shown), for receiving the sensing results obtained from the sensor module 50 and controlling the liquid source to supply the liquid into the receiving groove 2011.

The base seat 10 includes a base portion 111 and a guiding portion 113. A mounting hole 1311 is defined in the base portion 111. The guiding portion 113 perpendicularly extends from a periphery of the mounting hole 1311, for limiting a movement of the quartz glass tube 30 along a direction perpendicular to the axial direction thereof.

The support frame 20 is substantially a hollow cylinder. Two sliding grooves 21 are defined in two sidewalls of the support frame 20. A through hole 23 is defined in a bottom wall of the support frame 20. The support frame 20 is mounted on the base portion 111 of the base seat 10, and thereby allowing the guiding portion 113 to pass through the through hole 23.

The guiding member 25 is substantially a hollow cylinder. A through hole 27 is defined in a bottom wall of the guiding member 25. The guiding member 25 is mounted on the base portion 111 of the base seat 10 opposite to the support frame 20. The through hole 27, the through hole 23, and the mounting hole 1311 are substantially coaxial, respectively, such that the movement of the quartz glass tube 30 is further limited along a direction perpendicularly to the axial direction thereof.

The quartz glass tube 30 is movably mounted in the mounting hole 1311 of the base seat 10. The quartz glass tube 30 floats on the liquid in the container 200. An opening of the quartz glass tube 30 is securely fixed to and sealed by the sealing member 33. The sealing member 33 is securely fixed to the light masking plate 40, such that the light masking plate 40 moves axially with the quartz glass tube 30. In the illustrated embodiment, the sealing member 33 is made of plastic. The light masking plate 40 is made of stainless steel.

The sensor module 50 includes a first sensor 51 and a second sensor 53. The first sensor 51 and the second sensor 53 are mounted on the sidewall of the support frame 20 adjacent to one of the sliding grooves 21. The first sensor 51 and the second sensor 53 are spaced from each other. A distance between the first sensor 51 and the second sensor 53 is equal to a distance between the lowest level line L and the highest level line H. In the illustrated embodiment, the first sensor 51 and the second sensor 53 are photoelectric sensors.

Figure 2:
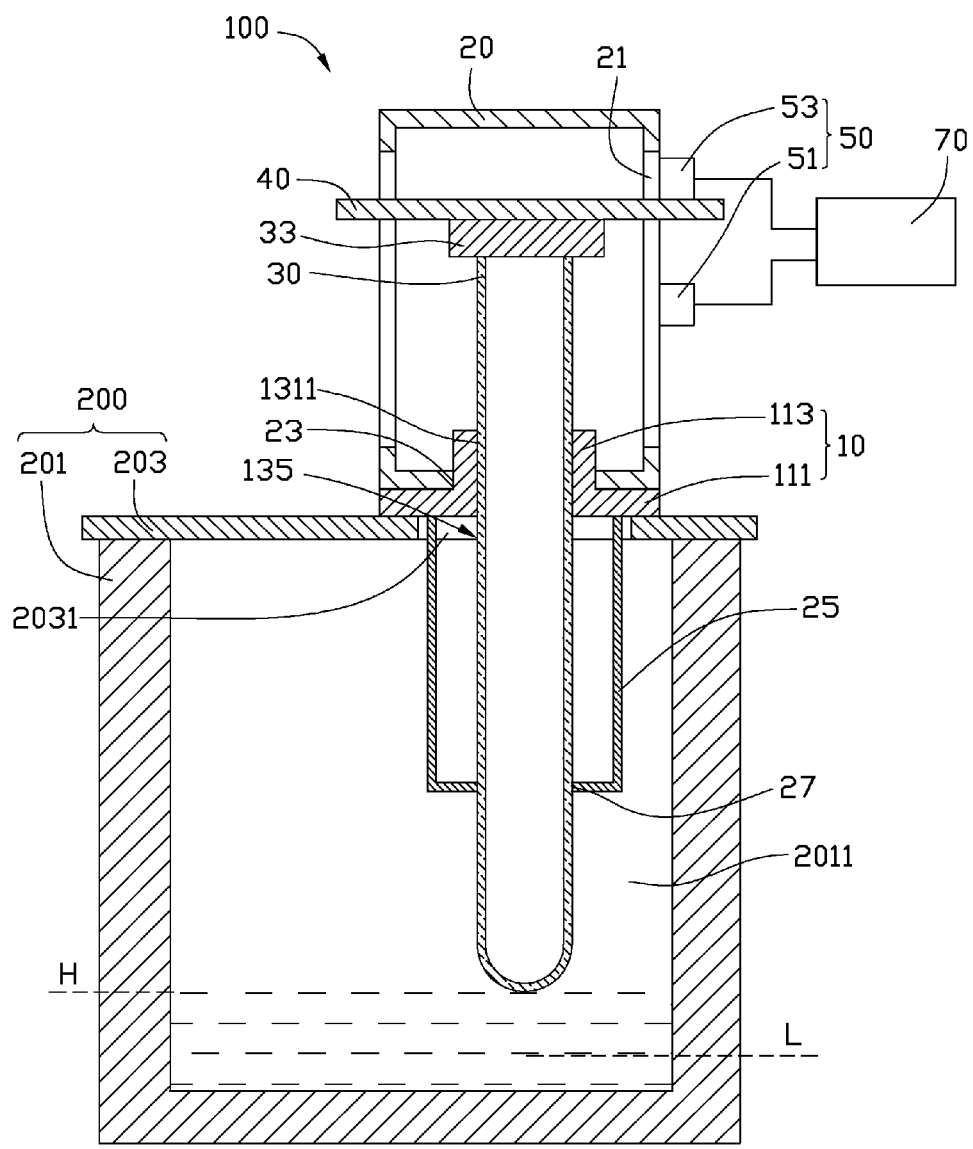
FIG. 2 is similar to FIG. 1, but the quartz glass tube being in a second predetermined position.

During usage, when the liquid level of the liquid inside the container 200 reaches the lowest level line L, the light masking plate 40 contacts with the first sensor 51, and a light emitted by the first sensor 51 is thereby masked by the light masking plate 40, such that the control module 70 receives a first sensing result and controls the liquid source to supply the liquid into the receiving groove 2011 of the container 200. When the liquid level of the liquid inside the container 200 reaches the highest level line H (referring to FIG. 2), the light masking plate 40 contacts with the second sensor 53, and a light emitted by the second sensor 53 is thereby masked by the light masking plate 40, such that the control module 70 receives a second sensing result and controls the liquid source to stop supplying the liquid into the receiving groove 2011 of the container 200.

A magnetic ring can be omitted in the quartz glass liquid level sensor 100, and the quartz glass tube 30 is anti-corrosive and heatproof, thus the quartz glass liquid level sensor 100 has a relatively long service life. In addition, the control module 70 is capable of automatically control the liquid source to supply the liquid into the container 200, such that an operation of the quartz glass liquid level sensor 100 becomes convenient.

In other embodiments, the sensor module 50 can further include other sensors as needed. For example, the sensor module 50 may further include a third sensor located between the first sensor 51 and the second sensor 53. The seat base 10 can be omitted, and the support frame 20 is directly mounted on the cover 203. The sealing member 33 can be omitted, and the quartz glass tube 30 can be directly sealed by the light masking plate 40. The guiding member 25 can be omitted, and another guiding portion perpendicularly extends from the periphery of the mounting hole 1311 opposite to the guiding portion 113.

While various embodiments have been described and illustrated, the disclosure is not to be construed as being restricted thereto. Various modifications can be made to the embodiments by those skilled in the art without departing from the true spirit and scope of the disclosure as defined by the appended claims.

What is claimed is:

1. A quartz glass liquid level sensor for sensing a liquid level of a liquid in a container, the sensor comprising:
    a support frame;
    a light masking plate movably mounted on the support frame;
    a quartz glass tube movably mounted to the support frame, one end of the quartz glass tube being securely fixed to the light masking plate;
    a sensor module mounted on the support frame, for sensing a position of the light masking plate relative to the support frame, and comprising:
        a first photoelectric sensor mounted on the support frame, and
        a second photoelectric sensor mounted on the support frame and spaced from the first photoelectric sensor, a distance between the first photoelectric sensor and the second photoelectric sensor being equal to a distance between a lowest level line and a highest level line defined on the container; and
        a control module coupled to the first photoelectric sensor and the second photoelectric sensor, and configured to receiving sensing results obtained from the first photoelectric sensor and the second photoelectric sensor;
        wherein when the liquid level of the liquid reaches the lowest level line, the light masking plate contacts with the first photoelectric sensor, and a light emitted by the first photoelectric sensor is masked by the light masking plate, such that the control module receives a first sensing result and controls to supply the liquid into the container;
        wherein when the liquid level of the liquid reaches the highest level line, the light masking plate contacts with the second photoelectric sensor, and a light emitted by the second photoelectric sensor is masked by the light masking plate, such that the control module receives a second sensing result and controls to stop supplying the liquid into the container.

2. The quartz glass liquid level sensor of claim 1, wherein a sliding groove is defined in a sidewall of the support frame, the light masking plate is movable mounted in the sliding groove, and the sensor module is placed adjacent to the sliding groove.

3. The quartz glass liquid level of claim 2, wherein the first sensor and the second sensor are mounted on the sidewall of the support frame adjacent to the sliding groove.

4. The quartz glass liquid level sensor of claim 1, further comprising a base seat, wherein the support frame is mounted on the base seat.

5. The quartz glass liquid level sensor of claim 4, wherein the base seat comprises a base portion and a guiding portion, a mounting hole is defined in the base portion, the guiding portion perpendicularly extends from a periphery of the mounting hole, the support frame is mounted on the base portion of the base seat, and the quartz glass tube passes through the mounting hole.

6. The quartz glass liquid level sensor of claim 5, further comprising a guiding member, wherein a through hole is defined in a bottom wall of the guiding member, the guiding member is mounted on the base portion of the base seat opposite to the support frame, and the through hole and the mounting hole are substantially coaxial.

7. The quartz glass liquid level sensor of claim 1, further comprising a sealing member, wherein the quartz glass tube is securely fixed to and sealed by the sealing member, and the sealing member is securely fixed to the light masking plate.

8. A quartz glass liquid level sensor for sensing a liquid level of a liquid in a container, the quartz glass liquid level sensor comprising:
    a support frame;
    a light masking plate movably mounted on the support frame;
    a quartz glass tube floating on the liquid and movably mounted to the support frame, one end of the quartz glass tube being securely fixed to the light masking plate;
    a sensor module mounted on the support frame, for sensing a position of the light masking plate relative to the support frame, and comprising:
        a first photoelectric sensor mounted on the support frame, and
        a second photoelectric sensor mounted on the support frame and spaced from the first photoelectric sensor, a distance between the first photoelectric sensor and the second photoelectric sensor being equal to a distance between a lowest level line and a highest level line defined on the container; and
        a control module coupled to the first photoelectric sensor and the second photoelectric sensor, and configured to receiving sensing results obtained from the first photoelectric sensor and the second photoelectric sensor;
        wherein when the liquid level of the liquid reaches the lowest level line, the light masking plate contacts with the first photoelectric sensor, and light emitted by the first photoelectric sensor is masked by the light masking plate, such that the control module receives a first sensing result and controls to supply the liquid into the container;
        wherein when the liquid level of the liquid reaches the highest level line, the light masking plate contacts with the second photoelectric sensor, and light emitted by the second photoelectric sensor is masked by the light masking plate, such that the control module receives a second sensing result and controls to stop supplying the liquid into the container.

9. The quartz glass liquid level sensor of claim 8, wherein a sliding groove is defined in a sidewall of the support frame, the light masking plate is movably mounted in the sliding groove, and the sensor module is placed adjacent to the sliding groove.

10. The quartz glass liquid level of claim 9, wherein the first sensor and the second sensor are mounted on the sidewall of the support frame adjacent to the sliding groove, when the quartz glass tube reaches a first predetermined position, the light masking plate contacts with the first sensor, and when the quartz glass tube reaches a second predetermined position, the light masking plate contacts with the second sensor.

11. The quartz glass liquid level sensor of claim 8, further comprising a base seat mounted on the container, wherein the support frame is mounted on the base seat.

12. The quartz glass liquid level sensor of claim 11, wherein the base seat comprises a base portion and a guiding portion, a mounting hole is defined in the base portion, the guiding portion perpendicularly extends from a periphery of the mounting hole, the support frame is mounted on the base portion, and the quartz glass tube passes through the mounting hole.

13. The quartz glass liquid level sensor of claim 12, further comprising a guiding member, wherein a through hole is defined in a bottom wall of the guiding member, the guiding member is mounted on the base portion of the base seat opposite to the support frame, and the through hole and the mounting hole are substantially coaxial.

14. The quartz glass liquid level sensor of claim 8, further comprising a sealing member, wherein the quartz glass tube is securely fixed to and sealed by the sealing member, and the sealing member is securely fixed to the light masking plate.

* * * * *